United States Patent [19]

Schell, Jr.

[11] 4,419,269

[45] Dec. 6, 1983

[54] TRANSITION METAL CONTAINING CATALYST

[75] Inventor: Joseph G. Schell, Jr., Baton Rouge, La.

[73] Assignee: The Dow Chemical Company, Midland, Mich.

[21] Appl. No.: 447,385

[22] Filed: Dec. 6, 1982

[51] Int. Cl.$^3$ ............................................. C08F 4/64
[52] U.S. Cl. .................................. 502/169; 526/125
[58] Field of Search ..................................... 252/429 B

[56] References Cited

U.S. PATENT DOCUMENTS

| | | | |
|---|---|---|---|
| 4,076,924 | 2/1978 | Toyota et al. | 526/125 |
| 4,085,276 | 4/1978 | Toyota et al. | 526/122 |
| 4,107,415 | 8/1978 | Giannini et al. | 526/114 |
| 4,143,223 | 3/1979 | Toyota et al. | 526/125 |
| 4,149,990 | 4/1979 | Giannini et al. | 252/429 B |
| 4,175,171 | 11/1979 | Ito et al. | 526/125 |
| 4,221,894 | 9/1980 | Ushida et al. | 526/125 |
| 4,226,741 | 10/1980 | Luciani et al. | 252/429 B |
| 4,234,710 | 11/1980 | Moberly et al. | 526/125 |
| 4,244,838 | 1/1981 | Gessell | 252/429 B |
| 4,246,383 | 1/1981 | Gessell | 526/92 |
| 4,250,285 | 2/1981 | Minami et al. | 526/125 |

FOREIGN PATENT DOCUMENTS 1536358 12/1978 United Kingdom.
1554340 10/1979 United Kingdom.
1564460 4/1980 United Kingdom.

*Primary Examiner*—Patrick Garvin
*Attorney, Agent, or Firm*—J. G. Carter

[57] ABSTRACT

A transition metal-containing catalyst is prepared by
(A) reacting in the presence of an inert hydrocarbon diluent
  (1) the reaction product of
    (a) an organomagnesium compound;
    (b) water, carbon dioxide or an organic oxygen-containing compound; and
    (c) an electron donor or Lewis base;
  and
  (2) a transition metal halide;
(B) recovering and washing the resultant solid reaction product with an inert hydrocarbon;
(C) reacting the washed solid product from (B) with
  (1) titanium tetrachloride and
  (2) a reducing agent;
(D) stirring the mixture until the brown $\beta$-crystalline form of titanium trichloride is transformed into the violet $\alpha$-crystalline form; and
(E) recovering and washing the resultant solid catalyst with an inert hydrocarbon.

3 Claims, No Drawings

TRANSITION METAL CONTAINING CATALYST

BACKGROUND OF THE INVENTION

This invention relates to a new catalyst composition useful for initiating and promoting polymerization of one or more α-olefins and to a polymerization process employing such a catalyst composition.

It is well known that olefins such as ethylene, propylene, and 1-butene in the presence of metallic catalysts, particularly the reaction products of organometallic compounds and transition metal compounds can be polymerized to form substantially linear polymers of relatively high molecular weight. Typically such polymerizations are carried out at relatively low temperatures and pressures.

Among the methods for producing such linear olefin polymers, some of the most widely utilized are those described by Professor Karl Ziegler in U.S. Pat. Nos. 3,113,115 and 3,257,332. In these methods, the catalyst employed is obtained by admixing a compound of a transition metal of Groups 4b, 5b, 6b and 8 of Mendeleev's Periodic Table of Elements with an organometallic compound. Generally the halides, oxyhalides and alkoxides or esters of titanium, vanadium and zirconium are the most widely used transition metal compounds. Common examples of the organometallic compounds include the hydrides, alkyls and haloalkyls of aluminum, alkylaluminum halides, Grignard reagents, alkali metal aluminum hydrides, alkali metal borohydrides, alkali metal hydrides, alkaline earth metal hydrides and the like. Usually, the polymerization is carried out in a reaction medium comprising an inert organic liquid, e.g., an aliphatic hydrocarbon and the aforementioned catalyst. One or more olefins may be brought into contact with the reaction medium in any suitable manner, and a molecular weight regulator, such as hydrogen, is often added to the reaction vessel in order to control the molecular weight of the polymers. Such polymerization processes are either carried out at slurry polymerization temperatures (i.e., wherein the resulting polymer is not dissolved in the hydrocarbon reaction medium) or at solution polymerization temperatures (i.e., wherein the temperature is high enough to solubilize the polymer in the reaction medium).

Following polymerization, it is common to remove catalyst residues from the polymer by repeatedly treating the polymer with alcohol or other deactivating agent such as an aqueous basic solution. Such catalyst deactivation and/or removal procedures are expensive both in time and material consumed as well as the equipment required to carry out such treatment.

Luciani et al. in U.S. Pat. No. 4,226,741 disclose a catalyst useful in the preparation of stereospecific polymers from α-olefins. However, the catalyst employed is prepared at a minimum of 80° C.

The catalysts of the present invention can be prepared at temperatures below 80° C. thereby resulting in energy savings.

The catalysts of the present invention are useful in preparing stereospecific polymers in high yields.

SUMMARY OF THE INVENTION

The present invention concerns a catalyst useful in the preparation of stereospecific polymers of one or more α-olefins having at least three carbon atoms which is a transition metal-containing catalyst prepared by (A) reacting in the presence of an inert hydrocarbon diluent
  (1) the reaction product of
    (a) an organomagnesium compound;
    (b) water, carbon dioxide or an organic oxygen-containing compound; and
    (c) an electron donor or Lewis base; and
  (2) a transition metal, Tm, halide;
(B) recovering and washing the resultant solid reaction product with an inert hydrocarbon;
(C) reacting the washed solid product from (B) with, in the order indicated,
  (1) titanium tetrachloride and
  (2) a reducing agent;
(D) stirring the mixture until the resultant brown β-crystalline form of titanium trichloride is transformed into the violet α-crystalline form; and
(E) recovering and washing the resultant solid catalyst with an inert hydrocarbon;

and wherein the components are employed in quantities so as to provide a sufficient quantity of component (A-1-b) to lower the amount of hydrocarbyl groups present in component (A-1-a) such that the resultant product will not substantially reduce $TiCl_4$ at 25° C. Component (A-1-c) is employed in quantity which provides a final atomic ratio of electron donor:total combined transition metal in components (A-2) and (C1) of from about 0.05:1 to about 50:1, preferably from about 0.1:1 to about 5:1, most preferably from about 0.2:1 to 1:1. At least a sufficient amount of halogen from component (A-2) is employed to convert essentially all of the groups attached to a magnesium atom in component (A-1) to halide groups. The quantity of component (C-1) is that which is sufficient to provide a Ti from component (C-1):Mg atomic ratio of from about 0.01:1 to about 100:1, preferably from about 1:1 to about 50:1, and most preferably from 5:1 to about 30:1; and the quantity of component (C-2) is employed so as to only reduce a portion of the titanium tetrachloride so as to provide a final atomic ratio in the solid washed product of Ti:Mg of 0.02:1 to about 20:1, preferably from about 0.2:1 to about 10:1, most preferably from about 0.5:1 to about 5:1.

DESCRIPTION OF THE PREFERRED EMBODIMENTS

The organomagnesium compounds which are suitably employed in the present invention include those represented by the formula $R_2Mg \cdot xMeR'_{x'}$ wherein each R is independently a hydrocarbyl group and each R' is independently a hydrogen, hydrocarbyl or hydrocarbyloxy group, Me is Al, Zn or B, x has a value from 0 to 10 and x' has a value equal to the valence of Me.

The term hydrocarbyl as employed herein refers to a monovalent hydrocarbon radical such as alkyl, cycloalkyl, aryl, aralkyl, alkenyl and similar hydrocarbon radicals having from 1 to about 20 carbon atoms with alkyl having from 1 to 10 carbon atoms being preferred.

The term hydrocarbyloxy as employed herein refers to monovalent oxyhydrocarbon radicals such as alkoxy, cycloalkoxy, aryloxy, aralkoxy, alkenoxy and similar oxyhydrocarbon atoms having from 1 to about 20 carbon atoms with alkoxy groups having from 1 to 10 carbon atoms being the preferred hydrocarbyloxy radicals.

The quantity of $MeR'_{x'}$, i.e. the value of x, is preferably the minimum amount which is sufficient of render the magnesium compound soluble in the inert solvent or diluent which is usually a hydrocarbon or mixture of hydrocarbons. The value of x therefore is from zero to about 10, usually from about 0.2 to about 2.

Particularly suitable organomagnesium compounds include, for example, di-(n-butyl) magnesium, n-butyl-sec-butyl magnesium, diisopropyl magnesium, di-n-hexyl magnesium, isopropyl-n-butyl magnesium, ethyl-n-hexyl magnesium, ethyl-n-butyl magnesium, di-(n-octyl) magnesium, butyl octyl and such complexes as di-n-butyl magnesium.⅓ aluminum triethyl, di-(n-butyl) magnesium.1/6 aluminum triethyl, mixtures thereof and the like.

Suitable oxygen-containing compounds include, for example, water, carbon dioxide, hydroxyl-containing organic compounds such as alcohols, glycols polyoxyalkylene glycols and the like, aldehydes, ketones, acetals, ketals, carboxylic acids, carboxylic acid esters, orthoesters or halides, carboxylic acid anhydrides, organic carbonates, mixtures thereof and the like.

Suitable hydroxyl-containing compounds include those represented by the formulas

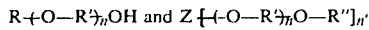

R+O—R'+ₙOH and Z+(–O—R'+ₙO—R"]ₙ' wherein each R is a hydrocarbyl group having from 1 to about 20 preferably from 1 to about 10 carbon atoms or a halogen, NHR or NH₂ substituted hydrocarbyl group having from 1 to about 20 preferably from 1 to about 10 carbon atoms, each R' is independently a divalent hydrocarbyl group having from 1 to about 20 preferably from 1 to about 10 carbon atoms, each R" is independently hydrogen, a hydrocarbyl group having from 1 to about 20 preferably from 1 to 10 carbon atoms or a halogen, NHR or NH₂ substituted hydrocarbyl group having from 1 to about 20 preferably from 1 to about 10 carbon atoms, at least one of which is hydrogen, Z is a multivalent organic radical containing from 2 to about 20 carbon atoms, n has a value from zero to about 10 and n' has a value of from 2 to about 10.

Particularly suitable hydroxyl-containing compounds include alcohols such as for example methyl alcohol, ethyl alcohol, n-propyl alcohol, isopropyl alcohol, n-butyl alcohol, sec-butyl alcohol, tert-butyl alcohol, octadecyl alcohol, glycols, 1,2-butylene glycol, 1,3-propylene glycol, 1,4-butanediol, 1,6-hexane diol, other hydroxyl containing compounds such as, for example, glycerine, trimethylol propane, hexane triol, phenol, 2,6-di-tert-butyl-4-methylphenol, mixtures thereof and the like. Also suitable are the adducts of ethylene oxide, 1,2-propylene oxide, 1,2-butylene oxide, 2,3-butylene oxide, styrene oxide or mixtures of such oxides with the previously mentioned or other hydroxyl-containing compounds such as pentaerythritol, sucrose, sorbitol and the like, as well as the alkyl and aryl capped hydroxyl-containing compounds so long as there remains at least 1 hydroxyl group per molecule.

Suitable aldehydes which can be employed herein include those aldehydes represented by the formula

$$R-\overset{O}{\underset{\|}{C}}-H \qquad (I)$$

wherein R is hydrogen or a hydrocarbyl group having from 1 to about 20 carbon atoms, preferably an aliphatic hydrocarbyl group having from 1 to about 10 carbon atoms. Particularly suitable aldehydes include, for example, formaldehyde, acetaldehyde, propionaldehyde, butyraldehyde, benzaldehyde, mixtures thereof and the like.

Suitable ketones which can be employed herein include, for example, those represented by the formula

$$R-\overset{O}{\underset{\|}{C}}-R \qquad (II)$$

wherein each R is independently a hydrocarbyl group having from 1 to about 20 carbon atoms, preferably from 1 to about 10 carbon atoms. Particularly suitable ketones include, for example, acetone, methyl ethyl ketone, 2,6-dimethyl-4-heptanone, mixtures thereof and the like.

The oxygen-containing compounds, particularly the alcohols, aldehydes and ketones can contain up to about 50 percent, preferably about 1 percent or less water by weight.

Suitable carboxylic acids which can be employed herein include those represented by the formulas

$$R-\overset{O}{\underset{\|}{C}}-OH \qquad (IV)$$

$$HO-\overset{O}{\underset{\|}{C}}-R-\overset{O}{\underset{\|}{C}}-OH \qquad (V)$$

wherein each R is a hydrocarbyl group having from 1 to about 20 carbon atoms, particularly from about 1 to about 10 carbon atoms. Particularly suitable carboxylic acids include, for example, formic acid, acetic acid, propionic acid, oxalic acid, benzoic acid, 2-ethylhexanoic acid, acrylic acid, methacrylic acid, mixtures thereof and the like.

Suitable acetals which can be employed herein include, for example, those represented by the formula

$$R-O-\overset{H}{\underset{R}{\overset{|}{C}}}-O-R \qquad (VI)$$

wherein each R is independently a hydrocarbyl group having from 1 to about 20 carbon atoms, preferably from 1 to about 10 carbon atoms. Particularly suitable acetals which can be employed includes, for example, acetal, 1,1-diethoxypropane, mixtures thereof and the like.

Suitable ketals which can be employed herein include, for example, those represented by the formula

$$R-O-\overset{R}{\underset{R}{\overset{|}{C}}}-O-R \qquad (VII)$$

wherein each R is independently a hydrocarbyl group having from 1 to about 20 carbon atoms, preferably from 1 to about 10 carbon atoms. Particularly suitable ketals include, for example, 2,2-dimethoxypropane, 2,2-dimethoxyhexane, 2,2-diethoxypropane, mixtures thereof and the like.

Suitable esters of carboxylic acids which can be employed herein include, for example, those represented by the formulas

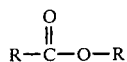

(VIII)

(IX)

wherein each R is independently a hydrocarbyl group having from 1 to about 20 carbon atoms, preferably from 1 to about 10 carbon atoms. Particularly suitable esters include, for example, ethyl acetate, ethyl formate, ethyl benzoate, methyl acetate, methyl formate, mixtures thereof and the like.

Suitable orthoesters which can be employed herein include, for example, those represented by the formula

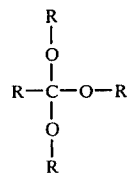

(X)

wherein each R is independently a hydrocarbyl group having from 1 to about 20 carbon atoms, preferably from 1 to about 10 carbon atoms. Particularly suitable orthoesters include, for example, triethylorthoformate, triethylorthoacetate, mixtures thereof and the like.

Suitable carboxylic acid halides include those represented by the formulas

(XI)

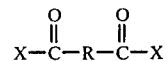

(XII)

wherein each R is independently a hydrocarbyl group having from 1 to about 20 carbon atoms, preferably from 1 to about 10 carbon atoms and each X is a halogen, preferably chlorine or bromine. Particularly suitable acid halides include, for example, acetyl chloride, oxalyl chloride, propionyl chloride, benzoyl chloride, mixtures thereof and the like.

Suitable organic carbonates which can be employed herein include, for example, those represented by the formulas

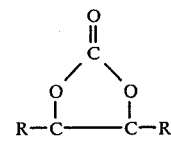

(XIII)

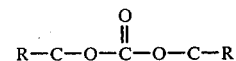

(XIV)

wherein each R is independently a hydrocarbyl group having from 1 to about 20 carbon atoms, preferably from 1 to about 10 carbon atoms. Particularly suitable carbonates include, for example, diethylcarbonate, ethylene carbonate, dipropylcarbonate, propylene carbonate, styrene carbonate, mixtures thereof and the like.

Suitable carboxylic acid anhydrides include, for example, those represented by the formulas

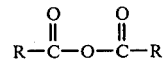

(XV)

(XVI)

wherein each R is independently a hydrocarbyl group having from 1 to about 20 carbon atoms, preferably from 1 to about 10 carbon atoms. Particularly suitable anhydrides include, for example, acetic anhydride, propionic anhydride, mixtures thereof and the like.

Suitable electron donors (Lewis base) which can be employed herein include those described by Luciani et al. in U.S. Pat. No. 4,226,741 which is incorporated herein by reference. Particularly suitable electron donors include, for example, esters of carboxylic acids, which esters have from about 1 to about 8, preferably from about 1 to about 4 carbon atoms such as, for example, ethyl benzoate, methyl benzoate, n-propyl benzoate, n- and iso-butyl benzoates, n- and iso-amyl benzoates, n-hexyl benzoate, n-octyl benzoate, 2-ethylhexyl benzoate, methyl toluate, n-propyl toluate, n- and iso-butyl toluates, n- and iso-amyl toluates, n-hexyl toluate, n-octyl toluate, 2-ethylhexyl toluate, methyl anisate, ethyl anisate, n-propyl anisate, n- and iso-butyl anisates, mixtures thereof and the like.

Suitable transition metal halides which can be employed herein include compounds represented by the formula $TmY_nX_{z-n}$ wherein Tm is a transition metal selected from groups IV-B, V-B and VI-B of the Periodic Table of the Elements, Y is oxygen, OR" or $NR_2''$; each R" is independently hydrogen or a hydrocarbyl group as previously defined; X is a halogen, preferably chlorine or bromine; z has a value corresponding to the valence of the transition metal, Tm; n has a value of from zero to 5 with the value of z-n being from at least 1 up to a value equal to the valence state of the transition metal, Tm.

Particularly suitable transition metal halide compounds include, those compounds of titanium, zirconium, vanadium and chromium such as, for example, titanium tetrachloride, titanium tetrabromide, dibutoxy titanium dichloride, monoethoxy titanium trichloride, isopropoxy titanium trichloride, chromyl chloride, vanadium oxytrichloride, zirconium tetrachloride, vanadium tetrachloride, mixtures thereof and the like.

Suitable reducing agents include those represented by the formulas $Al(R^3)_{3-m}X_m$, $B(R^3)_{3-m}X_m$, $ZnR^3{}_2$, $ZnR^3X$, $MgR^3X$ or $MgR^3{}_2$ including mixtures thereof wherein each $R^3$ is independently hydrogen or a hydrocarbyl group as hereinbefore defined; X is a halogen, preferably chlorine or bromine, a hydrocarbyloxy group as hereinbefore defined, or a $NR^3{}_2$ group; $R^3$ being as previous defined; m has a value from zero to 2, preferably zero or 1.

Particularly suitable reducing agents include, for example, triethylaluminum, ethylaluminum dichloride, diethylaluminum chloride, triisobutylaluminum, ethylaluminum sesquichloride, diisobutylaluminum hydride, trimethylaluminum, triethylboron, diethylzinc, dibutylmagnesium butylethyl magnesium, mixtures thereof and the like.

Suitable organic inert diluents in which the catalyst support and catalyst can be prepared and in which the α-olefin polymerization can be conducted include, for example, liquefied ethane, propane, isobutane, n-butane, isopentane, n-pentane, n-hexane, the various isomeric hexanes, isooctane, paraffinic mixtures of alkanes having from 8 to 12 carbon atoms, cyclohexane, methylcyclopentane dimethylcyclohexane, dodecane, eicosane industrial solvents composed of saturated or aromatic hydrocarbons such as kerosene, naphthas, etc., especially when freed of any olefin compounds and other impurities, and especially those having boiling points in the range from about −50° to about 200° C. Also included as suitable inert diluents are benzene, toluene, ethylbenzene, cumene, decalin and the like.

The catalysts of the present invention are advantageously prepared under an inert atmosphere such as nitrogen, argon or other inert gas at temperatures in the range of from about −50° C. to about 50° C., preferably from about 0° C. to about 30° C. The time of mixing the various components is not critical; however, times of from about one minute to about thirty-six hours are deemed to be most desirable. The time is ordinarily that which will permit completion of the reaction at the reaction temperature. Rapid mixing of the catalyst components or poor agitation produces a catalyst which is relatively non-uniform with respect to particle size distribution and produces polymers having an undesirably broad particle size distribution.

When the catalyst of this invention is used in solution polymerization conditions the above mentioned catalyst particle size distribution is not as important. However, if an aluminum compound is added as a solubilizing agent the catalyst preparation is simplified when using closed metal vessels for the catalyst preparation, such as would be used in the commercial production of polymers and copolymers of ethylene.

Suitable cocatalysts or activators with which the catalysts of the present invention can be reacted, contacted or employed in the polymerization of α-olefins includes those aluminum, boron, zinc or magnesium compounds represented by the formulas $Al(R^3)_{3-a}X_a$, $B(R^3)_{3-a}X_a$, $MgR^3_2$, $MgR^3X$, $ZnR^3_2$ or mixtures thereof wherein X and $R^3$ are as previously defined and a has a value of from zero to 2, preferably zero to 1 and most preferably zero.

Particularly suitable cocatalysts or activators include, for example, diethylaluminum chloride, ethylaluminum dichloride, diethylaluminum bromide, triethylaluminum, triisobutylaluminum, triethylaluminum, diethylzinc, dibutylmagnesium, butylethylmagnesium, butylmagnesium chloride, diisobutylaluminum hydride, isoprenylaluminum, triethylboron, trimethylaluminum, mixtures thereof and the like.

The cocatalysts or activators are employed in quantities such that the Al, B, Mg, Zn:Ti or mixtures thereof atomic ratio is from about 0.1:1 to about 1000:1, preferably from about 5:1 to about 500:1 and most preferably from about 10:1 to about 200:1.

The catalyst and cocatalyst or activator may be added separately to the polymerization reactor or they may be mixed together prior to addition to the polymerization reactor.

Olefins which are suitably homopolymerized or copolymerized in the practice of this invention are generally any one or more of the aliphatic α-olefins such as, for example, ethylene, propylene, butene-1, pentene-1, 3-methylbutene-1, 4-methylpentene-1, hexene-1, octene-1, dodecene-1, octadecene-1, 1,7-octadiene and the like. It is understood that α-olefins may be copolymerized with one or more other α-olefins and/or with small amounts i.e., up to about 25 weight percent based on the polymer of other ethylenically unsaturated monomers such as styrene, α-methylstyrene and similar ethylenically unsaturated monomers which do not destroy conventional Ziegler catalysts. Most benefits are realized in the polymerization of aliphatic α-monoolefins, particularly ethylene and mixtures of ethylene and up to 50 weight percent, especially from about 0.1 to about 40 weight percent of propylene, butene-1, hexene-1, octene-1, 4-methylpentene-1, 1,7-octadiene or similar α-olefin or α-diolefin based on total monomer.

In the polymerization process employing the aforementioned catalytic reaction product, polymerization is effected by adding a catalytic amount of the above catalyst composition to a polymerization zone containing α-olefin monomer, or vice versa. The polymerization zone is maintained at temperatures in the range from about 0° to about 300° C., generally at slurry polymerization temperatures, e.g., from about 0° to about 95° C., more preferably from about 50° to 90° C., for a residence time of about 15 minutes to 24 hours, preferably 30 minutes to 8 hours. It is generally desirable to carry out the polymerization in the absence of moisture and oxygen and a catalytic amount of the catalytic reaction product is generally within the range from about 0.0001 to about 0.1 milligram-atoms titanium per liter of diluent. It is understood, however, that the most advantageous catalyst concentration will depend upon polymerization conditions such as temperature, pressure, diluent and presence of catalyst poisons and that the foregoing range is given to obtain maximum catalyst yields. Generally in the polymerization process, a carrier which may be an inert organic diluent or excess monomer is generally employed. In order to realize the full benefit of the high efficiency catalyst of the present invention care must be taken to avoid oversaturation of the diluent with polymer. If such saturation occurs before the catalyst becomes depleted, the full efficiency of the catalyst is not realized. For best results, it is preferred that the amount of polymer in the carrier not exceed about 50 weight percent based on the total weight of the reaction mixture.

It is understood that inert diluents employed in the polymerization recipe are suitable as defined as hereinbefore.

The polymerization pressures preferably employed are relatively low, e.g., from about 10 to about 500 psig. However, polymerization within the scope of the present invention can occur at pressures from atmospheric up to pressures determined by the capabilities of the polymerization equipment. During polymerization it is desirable to agitate the polymerization recipe to obtain better temperature control and to maintain uniform polymerization mixtures throughout the polymerization zone.

Hydrogen is often employed in the practice of this invention to control the molecular weight of the resultant polymer. For the purpose of this invention, it is beneficial to employ hydrogen in concentrations ranging from about 0 to about 80 volume percent in the gas or liquid phase in the polymerization vessel. The larger amounts of hydrogen within this range are found to produce generally lower molecular weight polymers. It is understood that hydrogen can be added with a monomer stream to the polymerization vessel or separately added to the vessel before, during or after addition of the monomer to the polymerization vessel, but during or before the addition of the catalyst. Using the general method described, the polymerization reactor may be operated liquid full or with a gas phase and at solution or slurry polymerization conditions.

The monomer or mixture of monomers is contacted with the catalytic reaction product in any conventional manner, preferably by bringing the catalyst composition and monomer together with intimate agitation provided by suitable stirring or other means. Agitation can be continued during polymerization. In the case of more rapid reactions with more active catalysts, means can be provided for refluxing monomer and solvent, if any of the latter is present and thus remove the heat of reaction. In any event, adequate means should be provided for dissipating the exothermic heat of polymerization, e.g., by cooling reactor walls, etc. If desired, the monomer can be brought in the vapor phase into contact with the catalytic reaction product, in the presence or absence of liquid material. The polymerization can be effected in a batch manner, or in a continuous manner, such as, for example, by passing the reaction mixture through an elongated reaction tube which is contacted externally with suitable cooling medium to maintain the desired reaction temperature, or by passing the reaction mixture through an equilibrium overflow reactor or a series of the same.

The polymer is readily recovered from the polymerization mixture by driving off unreacted monomer and solvent if any is employed. No further removal of impurities is required. Thus, a significant advantage of the present invention is the elimination of the catalyst residue removal steps. In some instances, however, it may be desirable to add a small amount of a catalyst deactivating reagent. The resultant polymer is found to contain insignificant amounts of catalyst residue.

The following examples are given to illustrate the invention, and should not be construed as limiting its scope. All parts and percentages are by weight unless otherwise indicated.

In the following examples, the melt index values $I_2$ and $I_{10}$ were determined by ASTM D 1238 conditions E and N respectively. The apparent bulk density was determined as an unsettled bulk density according to the procedure of ASTM 1895 employing a paint volumeter from the Sargent-Welch Scientific Company (catalog no. S-64985) as the cylinder instead of the one specified by the ASTM procedure.

GENERAL PROCEDURE

In each of the following examples, unless otherwise stated, the catalyst components were blended while in a gloved box filled with dry oxygen-free nitrogen.

The following materials were employed in the examples.

| Name | Remarks | Source |
|---|---|---|
| Butylethyl-magnesium | (10% in Heptane) | Texas Alkyls |
| Triisobutyl-aluminum | (18% in Hexane) | Texas Alkyls |
| 1-Propanol | Reagent Grade | Baker Chem. |
| Titanium Tetrachloride | (Lot 00139) | Baker Chem. |
| Propylene | | Air Products Manufacturing |
| Ethyl Benzoate | (98% by GC) | Chemists, Inc. |
| Triethyl-aluminum | (15% in Hexane) | Texas Alkyls |
| Diethyl-aluminum chloride | (25% in Hexane) | Texas Alkyls |
| 4-methyl-1-pentene | | MCB Chem. |

EXAMPLE 1

A. Catalyst Preparation 7.5 ml of 13.3 M n-propanol (100 millimoles) was added dropwise to a mixture of 39.3 ml of 0.637 M butyl-, ethylmagnesium (25 millimoles) and 20.3 ml of 0.616 M triisobutylaluminum (12.5 millimoles) diluted up to 200 ml with n-hexane. The reaction exothermed to 50° C. 10.5 ml of 0.700 M ethyl benzoate (7.4 millimoles) was added to the above solution and 11 ml of 9.1 M titanium tetrachloride (100 millimoles) was added dropwise at 25° C. The solids were allowed to settle and the supernatant liquid was removed by decantation. Fresh hexane was added and the decantation procedure repeated until a total of 5 decants had been made. Hexane was added to bring the total volume up to 200 ml. 55 ml of 9.1 M titanium tetrachloride (500 millimoles) was added. 17.1 ml 1.46 M diethylaluminum chloride (25 millimoles) was added dropwise. The catalyst was stirred an additional 16 hours, after which time the color had changed from brown to violet. The solids were allowed to settle and the supernatant liquid was removed by decantation. Fresh hexane was added and the decantation repeated a total of 5 times to remove the hexane soluble species.

B. Polymerization of Propylene 2.2 ml of 0.921 M triethylaluminum (2.0 millimoles) and 3.2 ml of an aliquot of the catalyst prepared above (0.08 millimoles Ti) were added to a 1 liter stirred stainless steel reactor containing 0.5 liter of dry, oxygen-free hexane. The reactor contents were heated to 70° C. Propylene was added to maintain a reactor pressure of 110 psig. After two hours at 70° C., the reactor contents were collected and the polypropylene dried in a vacuum overnight at 60° C. The total yield of polymer was 28 g. The residue of the polymer after extraction with boiling n-heptane was 55%. The efficiency of the catalyst was 23,000 g PP/g Ti/2 hr. at 110 psig propylene pressure.

EXAMPLE 2

A. Catalyst Preparation

The catalyst was prepared the same as in (A-1) except that 6.2 ml of 0.700 M ethyl benzoate (4.3 millimoles) was used instead of 10.5 ml.

B. Polymerization of 4-Methyl-1-Pentene 2.0 ml of 1.46 M diethylaluminum chloride (2.9 millimoles), 1.6 ml of 0.616 M triisobutylaluminum (1.0 millimoles), and 16.7 ml of an aliquot of the catalyst (0.10 millimoles Ti) were added to a 1 liter stirred stainless steel reactor containing 0.3 liter of dry, oxygen-free heptane. 50 ml of 4-methyl-1-pentene was then added to the reactor. After 2.5 hours at 50° C. and atmospheric pressure, the reactor contents were collected and the poly-4-methyl-1-pentene dried in a vacuum oven overnight at 60° C. The total yield of polymer was 21.2 g.

The residue of the polymer after extraction with boiling n-heptane was 65%. The efficiency of the catalyst was 4400 g polymer/g Ti/2.5 hr.

I claim:

1. A catalyst useful in the preparation of stereospecific polymer of one or more α-olefins having at least three carbon atoms which is a titanium-containing catalyst prepared by
   (A) reacting in the presence of an inert hydrocarbon diluent
      (1) the reaction product of
         (a) an organomagnesium compound;
         (b) water, carbon dioxide or an organic oxygen-containing compound; and
         (c) an electron donor or Lewis base; and
      (2) a transition metal, Tm, halide;
   (B) recovering and washing the resultant solid reaction product with an inert hydrocarbon;
   (C) reacting the washed solid product from (B) with, in the order indicated,
      (1) titanium tetrachloride and
      (2) a reducing agent;
   (D) stirring the mixture until the resultant brown β-crystalline form of titanium trichloride is transformed into the violet α-crystalline form;
   (E) recovering and washing the resultant solid catalyst with an inert hydrocarbon;

and wherein the components are employed in quantities so as to provide a sufficient quantity of component (A-1-b) to lower the amount of hydrocarbyl groups present in component (A-1-a) such that the resultant product will not substantially reduce $TiCl_4$ at 25° C. Component (A-1-c) is employed in quantity which provides a final atomic ratio of electron donor:total combined transition metal in components (A-2) and (C1) of from about 0.05:1 to about 50:1; at least a sufficient amont of halogen from component (A-2) is employed to convert essentially all of the groups attached to a magnesium atom in component (A-1) to halide groups. The quantity of component (C-1) is that which is sufficient to provide a Ti from component (C-1):Mg atomic ratio of from about 0.01:1 to about 100:1; and the quantity of component (C-2) is employed so as to only reduce a portion of the titanium tetrachloride so as to provide a final atomic ratio in the solid washed product of Ti:Mg of 0.02:1 to about 20:1.

2. A catalyst of claim 1 wherein
   (a) component (A-1-a) is a compound represented by the formula $R_2Mg \cdot xMeR'_{x'}$ wherein each R is independently a hydrocarbyl group having from 1 to about 20 carbon atoms; each R' is independently hydrogen, a hydrocarbyl group having from 1 to about 20 carbon atoms or a hydrocarbyloxy group having from 1 to about 20 carbon atoms; Me is Al, Zn or B; x has a value of from zero to 10 and x' has a value equal to the valence of Me;
   (b) component (A-1-b) is an alcohol or mixture of alcohols;
   (c) component (A-1-c) is a carboxylic acid ester;
   (d) the transition metal halide of component (A-2) is titanium tetrachloride;
   (e) component (C-2) is a compound represented by the formulas $Al(R^3)_{3-m}X_m$, $B(R^3)_{3-m}X_m$, $ZnR^3{}_2$, $ZnR^3X$, $MgR^3X$ or $MgR^3{}_2$ including mixtures thereof wherein each $R^3$ is independently hydrogen or a hydrocarbyl group as hereinbefore defined; X is a halogen, preferably chlorine or bromine, a hydrocarbyloxy group as hereinbefore defined, or a $NR^3{}_2$ group; $R^3$ being as previously defined; m has a value from zero to 2;
   (f) component (A-1-c) is employed in a quantity which provides a final atomic ratio of electron donor:total transition metal from components (A-2) and (C-1) of from about 0.1:1 to about 5:1;
   (g) component (C-1) is employed in a quantity sufficient to provide a Ti:Mg atomic ratio of from about 1:1 to about 50:1; and
   (h) component (c-2) is employed in a quantity sufficient to provide a final atomic ratio in the solid washed product of Ti:Mg of from about 0.2:1 to about 10:1.

3. A catalyst of claim 2 wherein
   (a) in component (A-1-a), Me is Al and each R and R' is independently an alkyl group having from 1 to about 10 carbon atoms;
   (b) component (A-1-b) is methyl alcohol, ethyl alcohol, n-propyl alcohol, isopropyl alcohol, n-butyl alcohol, sec-butyl alcohol, tert-butyl alcohol or octadecyl alcohol;
   (c) component (A-1-c) is an ester of benzoic acid;
   (d) component (A-2) is titanium tetrachloride;
   (e) component (C-2) is triethylaluminum of diethylaluminum chloride;
   (f) component (A-1-c) is employed in a quantity which provides a final atomic ratio of electron donor:total transition metal from components (A-2) and (C-1) of from about 0.2:1 to about 1:1;
   (g) component (C-1) is employed in a quantity sufficient to provide a Ti:Mg atomic ratio of from about 5:1 to about 30:1;
   (h) component (C-2) is employed in a quantity sufficient to provide a final atomic ratio in the solid washed product of Ti:Mg of from about 0.5:1 to about 5:1.

* * * * *

UNITED STATES PATENT AND TRADEMARK OFFICE
CERTIFICATE OF CORRECTION

PATENT NO. : 4,419,269
DATED : December 6, 1983
INVENTOR(S) : Joseph G. Schell, Jr.

It is certified that error appears in the above—identified patent and that said Letters Patent is hereby corrected as shown below:

Col. 2, line 68, "of" should read --to--.

Col. 8, line 21, "generally" should read --preferably--.

Col. 9, line 10, "togehter" should read --together--.

Col. 11, line 37, "amont" should read --amount--.

Col. 12, line 40, "of" should read --or--.

Signed and Sealed this

Twenty-fourth Day of April 1984

[SEAL]

Attest:

GERALD J. MOSSINGHOFF

Attesting Officer            Commissioner of Patents and Trademarks